United States Patent
Batzakis et al.

(10) Patent No.: US 10,392,132 B2
(45) Date of Patent: Aug. 27, 2019

(54) CURVED AIRCRAFT SUBSTRUCTURE REPAIR SYSTEMS AND METHODS

(71) Applicant: The Boeing Company, Chicago, IL (US)

(72) Inventors: Nicholas Batzakis, West Melbourne (AU); Steve Georgiadis, Melbourne (AU)

(73) Assignee: The Boeing Company, Chicago, IL (US)

( * ) Notice: Subject to any disclaimer, the term of this patent is extended or adjusted under 35 U.S.C. 154(b) by 217 days.

(21) Appl. No.: 15/224,349

(22) Filed: Jul. 29, 2016

(65) Prior Publication Data
US 2018/0029725 A1    Feb. 1, 2018

(51) Int. Cl.
*B64F 5/40* (2017.01)
*B64C 1/06* (2006.01)
*B64C 1/12* (2006.01)

(52) U.S. Cl.
CPC .............. *B64F 5/40* (2017.01); *B64C 1/061* (2013.01); *B64C 1/12* (2013.01)

(58) Field of Classification Search
CPC .......... B64C 1/06; B64C 1/061; B64C 1/064; B64C 1/065; B64C 1/068; B64C 1/12; B64C 3/18; B64C 3/182; B64C 3/185; B64C 3/187; B64F 5/0081; B64F 5/40
See application file for complete search history.

(56) References Cited

U.S. PATENT DOCUMENTS

| 4,410,370 A | * | 10/1983 | Baba .................... B32B 15/016 148/417 |
| 8,844,108 B2 | | 9/2014 | Miller et al. |
| 2004/0195452 A1 | * | 10/2004 | Brofeldt .................. B64C 1/12 244/119 |
| 2006/0226287 A1 | * | 10/2006 | Grantham ................ B64C 1/12 244/119 |

(Continued)

FOREIGN PATENT DOCUMENTS

| EP | 0 728 541 | 8/1996 |
| EP | 3 162 544 | 5/2017 |

(Continued)

OTHER PUBLICATIONS

M.R Ayatollahi, Fatigue Life Extension by Crack Repair Using Stop-Hole . . . ; Jun. 2014, Elsevier Ltd, Procedia Engineering 74 18-21.*

*Primary Examiner* — Philip J Bonzell
*Assistant Examiner* — Tye William Abell
(74) *Attorney, Agent, or Firm* — Haynes and Boone, LLP

(57) ABSTRACT

Systems and methods are provided for a curved aircraft substructure repair stiffener. The curved aircraft substructure repair stiffener may be formed by cutting a flat pattern, cutting a plurality of slits into the flat pattern, and bending the flat pattern a plurality of times. The curved aircraft substructure repair stiffener may be coupled to a portion of an aircraft to strengthen a portion of the aircraft. In certain examples, the portion of the aircraft may have been weakened due to repairs and the curved aircraft substructure repair stiffener may strengthen the section. In certain examples, one or more web stock may be coupled to the curved aircraft substructure repair stiffener to further stiffen the curved aircraft substructure repair stiffener.

18 Claims, 5 Drawing Sheets

(56) References Cited

U.S. PATENT DOCUMENTS

| | | | | |
|---|---|---|---|---|
| 2007/0016336 A1* | 1/2007 | Chapin, II | ............... | B64C 1/12 701/1 |
| 2008/0083491 A1* | 4/2008 | Sander | ............... | B64C 1/12 156/278 |
| 2009/0208691 A1* | 8/2009 | Whitworth | ............... | B23P 6/00 428/63 |
| 2010/0237195 A1* | 9/2010 | Stephan | ............... | B64C 1/12 244/132 |
| 2010/0308172 A1* | 12/2010 | Depeige | ............... | B64C 1/062 244/132 |
| 2012/0153082 A1 | 6/2012 | Rosman et al. | | |
| 2012/0304433 A1* | 12/2012 | Roux | ............... | B29C 73/04 29/402.09 |
| 2015/0083861 A1* | 3/2015 | Alby | ............... | B64C 1/064 244/119 |
| 2015/0225065 A1* | 8/2015 | Brunner | ............... | B64C 1/12 244/131 |
| 2015/0329192 A1* | 11/2015 | Taguchi | ............... | B64C 1/069 244/131 |
| 2017/0095983 A1* | 4/2017 | Offensend | ............... | B64F 5/10 |

FOREIGN PATENT DOCUMENTS

| | | |
|---|---|---|
| FR | 2 923 800 | 5/2009 |
| GB | 665 850 | 1/1952 |
| WO | WO 02/098733 | 12/2002 |
| WO | WO 2013/093323 | 6/2013 |

\* cited by examiner

CURVED AIRCRAFT SUBSTRUCTURE REPAIR SYSTEMS AND METHODS

TECHNICAL FIELD

The disclosure relates generally to aircraft and more specifically to repairing curved aircraft structures.

BACKGROUND

Aircraft fuselages and other structures may be curved. Repair of curved structures require entire substructures to be replaced with prefabricated spare parts. The spare parts are expensive and must be ordered, resulting in extended downtime for aircrafts being repaired.

SUMMARY

Systems and methods are disclosed herein for a curved aircraft substructure repair stiffener. In certain examples, a method may be disclosed. The method may include trimming a first stock into a blank shape, cutting a plurality of slits into the first stock, bending the first stock at least a plurality of times, where the bent first stock comprises a leg portion configured to be coupled to an aircraft, a side portion coupled to the leg portion, and a top portion coupled to the side portion, and where the leg portion and the side portion include the plurality of slits and the plurality of slits divides the leg portion into a plurality of leg flanges and the side portion into a plurality of side flanges, coupling the leg portion to a curved portion of the aircraft, where the leg portion substantially conforms to a curvature of the curved portion, and fastening the leg portion to the aircraft.

In certain other examples, an apparatus may be disclosed. The apparatus may include a first stock body including a leg portion including a plurality of leg flanges and configured to couple to and substantially conform to a curvature of a curved portion of an aircraft, a side portion coupled to the leg portion and including a plurality of side flanges, and a top portion coupled to the side portion, where at least a portion of the top portion is curved.

The scope of the invention is defined by the claims, which are incorporated into this section by reference. A more complete understanding of the disclosure will be afforded to those skilled in the art, as well as a realization of additional advantages thereof, by a consideration of the following detailed description of one or more implementations. Reference will be made to the appended sheets of drawings that will first be described briefly.

BRIEF DESCRIPTION OF THE DRAWINGS

Examples of the disclosure and their advantages are best understood by referring to the detailed description that follows. It should be appreciated that like reference numerals are used to identify like elements illustrated in one or more of the figures.

DETAILED DESCRIPTION

Systems and techniques for repairing curved aircraft structures are described in the disclosure herein in accordance with one or more examples. The aircraft structures may be any component of an aircraft such as, for example, the fuselage, aerodynamic devices such as wings, tails, horizontal stabilizers, or other airfoils, aircraft propulsors, and/or other components of the aircraft.

Such aircraft structures may be curved. Damage may be sustained by such aircraft structures. Conventional aircraft structure field repair techniques are suitable for repairing straight structures, conventional repair techniques for repairing curved structures require entire substructures to be replaced with prefabricated spare parts. The systems and techniques disclosed herein allow for curved aircraft structures to be field repaired.

Figure 1:
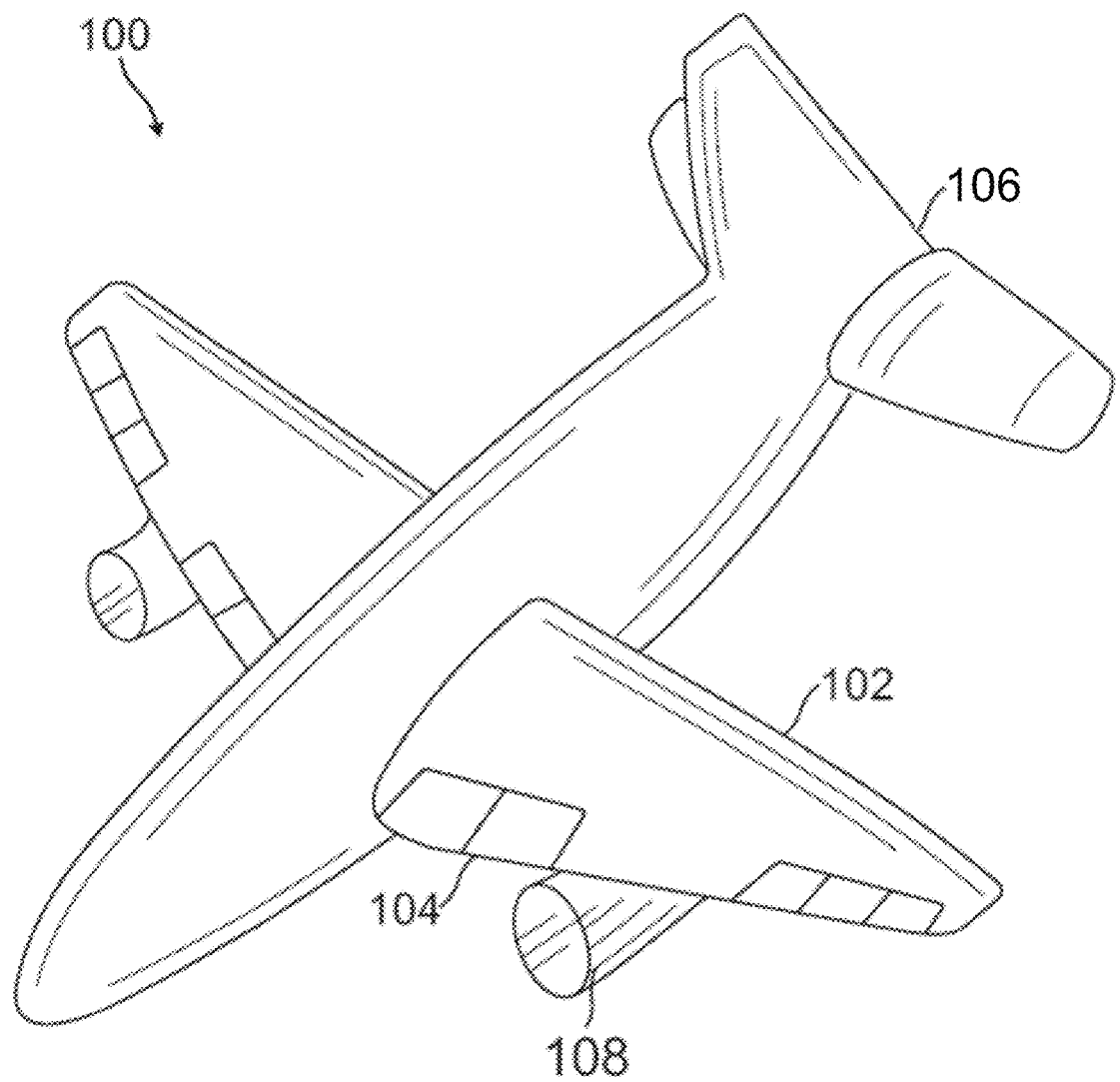
FIG. 1 illustrates a perspective view of an aircraft in accordance with an example of the disclosure.

FIG. 1 illustrates a perspective view of an aircraft in accordance with an example of the disclosure. In FIG. 1, aircraft 100 includes a main aerodynamic device 102, a secondary aerodynamic device 104, a fuselage 106, and a propulsor 108. Though the aircraft 100 shown in FIG. 1 may be a passenger airplane, other examples of the aircraft 100 may include any type of aircraft such as transport planes, helicopters, military aircraft, spacecraft, ground effects vehicles, and other such vehicles.

The propulsor 108 may be any type of aircraft engine. Non-limiting examples of such engines include turbofans, turboprops, and turbojets. An aircraft 100 may have any number of propulsors 108. The fuselage 106 may be any type of aircraft fuselage. The fuselage 106 may be curved and may bear structural loads. For example, the fuselage 106 may bear loads from the structure of the aircraft 100 itself, load carried by the aircraft 100, the main aerodynamic device 102, secondary aerodynamic device 104, the propulsor 108, and/or other components of the aircraft 100. As such, the fuselage 106 may require a certain structural rigidity and repaired sections of the fuselage 106 may be required to maintain such structural rigidity.

The main aerodynamic device 102 may be any fixed portion of a component of the aircraft 100 that may directly or indirectly affect the handling of the aircraft 100. As such, non-limiting examples of the main aerodynamic device 102 may include a wing, as shown in FIG. 1, a tail, a horizontal stabilizer, and another such control surface. For the purposes of this disclosure, any component that may generate lift, drag, steering force, and/or other such aerodynamic forces may be considered an aerodynamic device. In FIG. 1, the main aerodynamic device 102 may be fixed to the fuselage 106 of the aircraft 100, but other examples may fix the main aerodynamic device 102 to other portions of the aircraft 100.

The secondary aerodynamic device 104 may move relative to the main aerodynamic device 102. As such, the secondary aerodynamic device 104 may be a slat, a flap, a droop nose, an aileron, a flaperon, an elevator, a rudder, a moveable spoiler, portions of a flexible wing, or another such moveable aerodynamic component. Though FIG. 1 shows an example of an aircraft 100 with five secondary aerodynamic devices 104 per main aerodynamic device 102, other examples of, the aircraft 100 may include any number of secondary aerodynamic devices 104 per main aerodynamic device 102.

Figure 2:
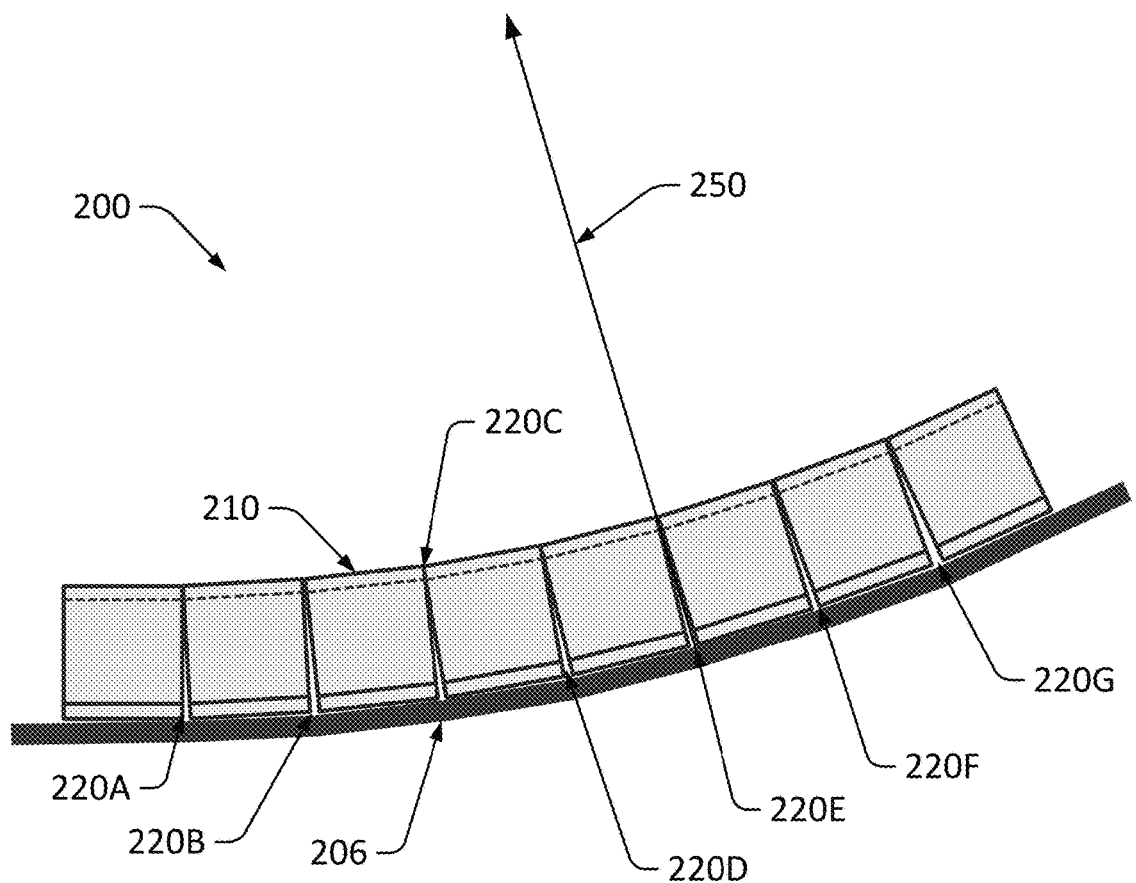
FIG. 2 illustrates a side view of a curved aircraft substructure repair stiffener in accordance with an example of the disclosure.

FIG. 2 illustrates a side view of a curved aircraft substructure repair stiffener in accordance with an example of the disclosure. FIG. 2 shows an aircraft repair 200 that includes curved aircraft substructure repair stiffener 210 coupled to fuselage 206. The fuselage 206 may be a curved structure of the aircraft 100. The curved aircraft substructure repair stiffener 210 includes slits 220A-G to aid in substantially conforming at least a part of the leg portion to the curvature of the fuselage 206.

In certain examples, the curved aircraft substructure repair stiffener 210 may be used to repair portions of the aircraft 100. The curved aircraft substructure repair stiffener 210 may allow repairs that structurally strengthen a damaged area of the aircraft 100. In certain examples, a portion of the aircraft 100 may be repaired and/or replaced and the curved aircraft substructure repair stiffener 210 may then be attached to the aircraft 100 (e.g., the repaired portion of the aircraft 100) to structurally strengthen the aircraft 100 (e.g., the repaired portion of the aircraft 100).

Additionally, FIG. 2 shows the radius 250. The radius 250 may be a radius of the curvature of the fuselage 206. At least a portion of the top portion of the curved aircraft substructure repair stiffener 210 may be curved such that at least a part of the leg portion substantially conforms to the radius 250 of the curvature of the fuselage 206. Additionally, at least one of the slits 220A-G may be parallel and/or collinear with the radius 250.

Figure 3A:
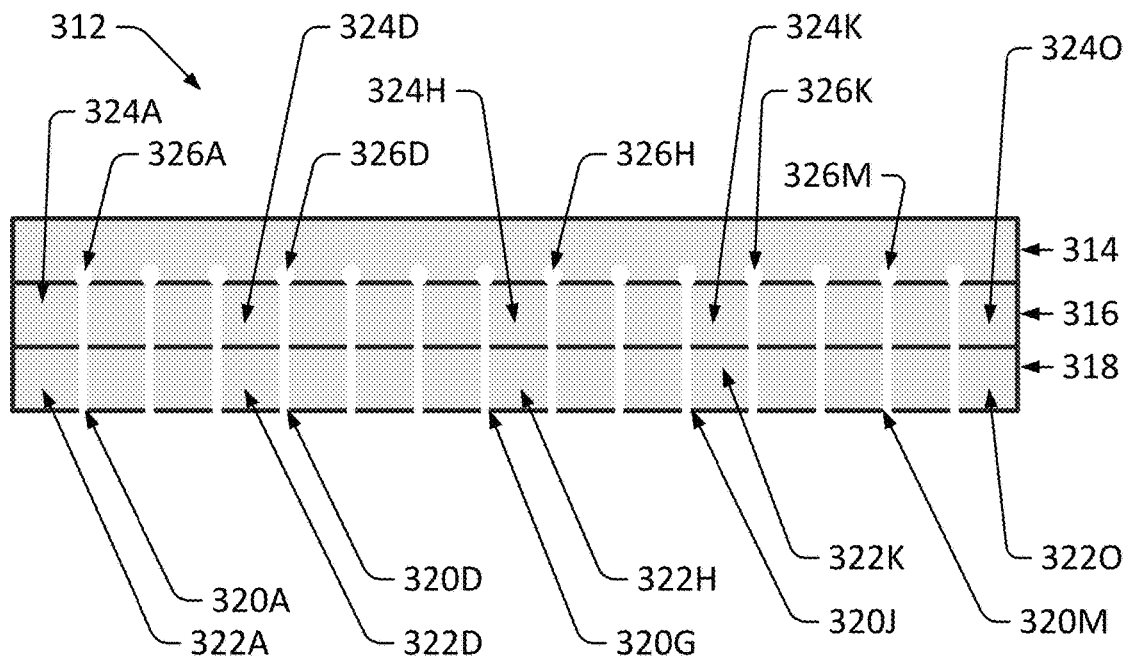
FIG. 3A illustrates a flat pattern of a Z shaped curved aircraft substructure repair stiffener in accordance with an example of the disclosure.

FIG. 3A illustrates a flat pattern of a Z shaped curved aircraft substructure repair stiffener in accordance with an example of the disclosure. FIG. 3A may show the flat pattern 312. The flat pattern 312 may be divided into a top portion 314, a side portion 316, and a leg portion 318. The leg portion 318 may include a plurality of leg flanges 322A-O and the side portion 316 may include a plurality of side flanges 324A-O. Each leg flange may be coupled to a corresponding side flange (e.g., leg flange 322A may be coupled to side flange 324A, leg flange 322B may be coupled to side flange 324B, and so on). Each of the leg flange and side flange may be defined, at least in part, by one or more slits 320A-N. As such, leg flange 322A and side flange 324A may be defined by, at least, two sides of the flat pattern 312 and the slit 320A, leg flange 322B and side flange 324B may be defined by, at least, a side of the flat pattern 312 and the slits 320A and 320B. Other leg flanges and side flanges may be defined by additional combinations of slits and portions of the flat pattern 312.

The slits 320A-N may be formed on the flat pattern by, for example, cutting, stamping, laser cutting, machining, or other techniques of forming the slits 320A-N. Additionally, in certain examples, the slits 320A-N may include stress relief features 326A-N. The stress relief features 326A-N may be a cutout at the end of the slits 320A-N such as, for example, a circular or other shaped cut. The stress relief features 326A-N may be formed along with the slits 320A-N or may be formed as a secondary processing step. The stress relief features 326A-N may aid in preventing further tearing of the slits 326A-N during bending of the flat pattern 312.

In certain examples, the slits 320A-N may include one or more slots and/or other cutouts. Such slots may augment or replace the slits. In such examples, the slots may also include one or more stress relief features and/or other features that may decrease stress and/or aid in the bending of the curved aircraft substructure repair stiffener.

Figure 3B:
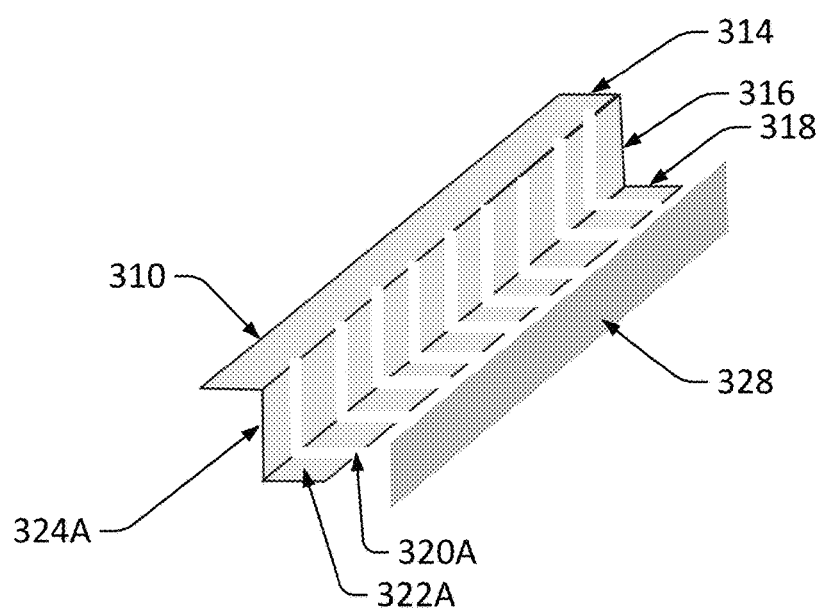
FIG. 3B illustrates an isometric view of a Z shaped curved aircraft substructure repair stiffener in accordance with an example of the disclosure.

FIG. 3B illustrates an isometric view of a Z shaped curved aircraft substructure repair stiffener in accordance with an example of the disclosure. FIG. 3B shows a curved aircraft substructure repair stiffener 310. The curved aircraft substructure repair stiffener 310 may be manufactured by bending the flat pattern 312 into the shape of the curved aircraft substructure repair stiffener 310. The curved aircraft substructure repair stiffener 310 may be a Z shaped repair stiffener.

In FIG. 3B, the leg portion 318 may include the leg flanges 322A-O and the side portion 316 may include the side flanges 324A-O. The curved aircraft substructure repair stiffener 310 may be bent into the Z shape. Each individual leg flange 322A-O and side flange 324A-O may not be connected to other individual leg flanges and side flanges. However, leg flange 322A may be coupled to corresponding side flange 324A and side flange 324A may then be coupled to the top portion 314. Other leg flanges and side flanges may also be coupled in that manner.

The top portion 314 may be bent such that the curved aircraft substructure repair stiffener 310 substantially conforms to a curvature of the portion of the aircraft 100 that the curved aircraft substructure repair stiffener 310 is repairing and/or is coupled to. For the purposes of this disclosure, "substantially conforms" may denote that a portion of the leg flanges may contact a portion of the aircraft 100 at some point. Bending of the top portion 314 may then allow for the leg portions 322A-O to substantially conform to the curvature of the portion of the aircraft 100 similar to that shown in FIG. 2. In certain examples, the curved aircraft substructure repair stiffener 310 may be bent according to one radius, but other examples may bend different portions of the curved aircraft substructure repair stiffener 310 according to a plurality of radii or may include a flat (unbent) portion in addition to the bent portion of the curved aircraft substructure repair stiffener 310.

In certain examples, a web stock 328 may be coupled to a portion of the curved substructure repair stiffener 310 to stiffen the curved substructure repair stiffener 310. The web stock 328 may, for example, be trimmed from the same or another piece of stock that is used to form the flat pattern 312. The web stock 328 may be formed into a web shape. The web stock 328 may be coupled to at least a portion of the leg portion 318 (in such a configuration, the web stock 328 may be known as a leg web), the side portion 316 (in such a configuration, the web stock 328 may be known as a side web), and/or the top portion 314 (in such a configuration, the web stock 328 may be known as a top web). The web stock 328 may be coupled to the curved substructure repair stiffener 310 via, for example, fasteners (e.g., nuts, bolts, screws, rivets, and other mechanical fasteners), welding, brazing, features on the curved substructure repair stiffener 310 and/or the web stock 328 (e.g., nuts, springs, and other forms), and/or other fastening techniques. In the example shown in FIG. 2, the web stock 328 may be coupled to a side of the side portion 316. In other examples, the web stock 328 may be coupled to another side of the side portion 316 or to another part of the curved substructure repair stiffener 310 (e.g., the top portion 314 and/or the leg portion 318).

Figure 4A:
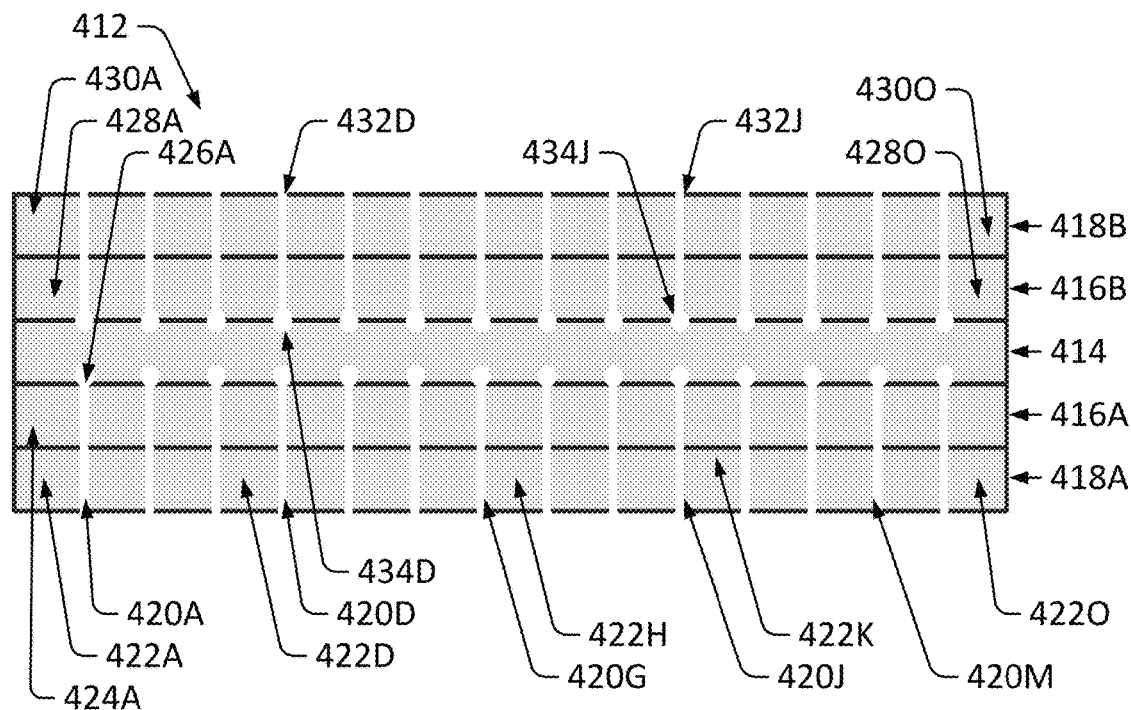
FIG. 4A illustrates a flat pattern of a hat shaped curved aircraft substructure repair stiffener in accordance with an example of the disclosure.

FIG. 4A illustrates a flat pattern of a hat shaped curved aircraft substructure repair stiffener in accordance with an example of the disclosure. FIG. 4A may show the flat pattern 412. The flat pattern 412 may be divided into a top portion 414, side portions 416A and 416B, and leg portions 418A and 418B. The flat pattern 412 of FIG. 4A may be a flat pattern for a hat shaped curved substructure repair stiffener (such as curved substructure repair stiffener 410 shown in FIG. 4B).

The leg portions 418A and 418B may include a plurality of leg flanges 422A-O and 430A-O, respectively. The side portions 416A and 416B may include a plurality of side flanges 424A-O and 428A-O, respectively. Each of the leg flange and side flange may be defined, at least in part, by one or more slits 420A-N or 432 A-N.

The slits 420A-N and 432A-N may be formed on the flat pattern by, for example, cutting, stamping, laser cutting, machining, or other techniques. In certain examples, the slits 420A-N and/or 432A-N may include stress relief features 426A-N and/or 434A-N. The stress relief features 426A-N and/or 434A-N may be a cutout at the end of the slits 420A-N and/or 432A-N. In certain examples, the slits 420A-N and/or 432A-N may be one or more slots.

Figure 4B:
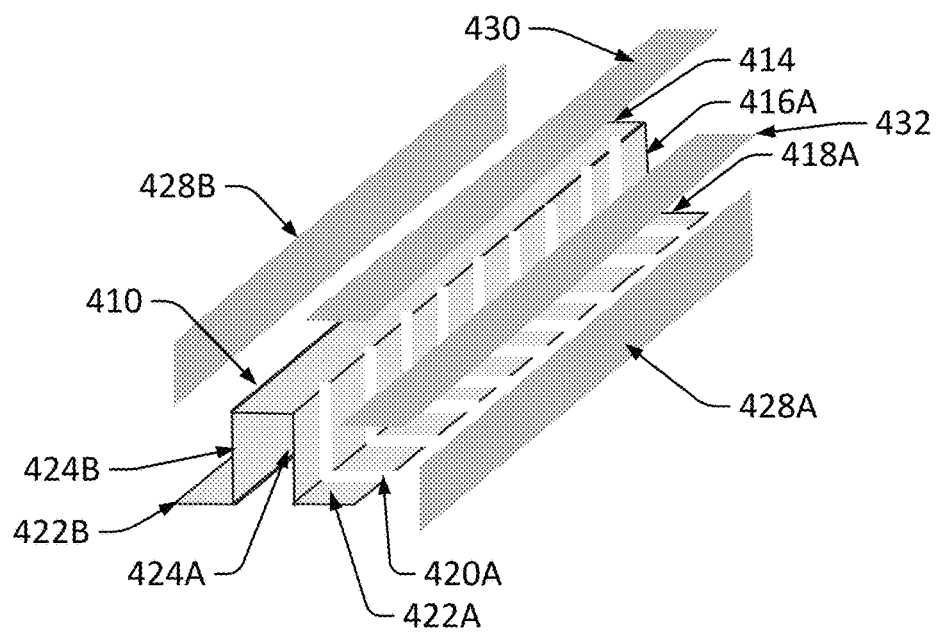
FIG. 4B illustrates an isometric view of a hat shaped curved aircraft substructure repair stiffener in accordance with an example of the disclosure.

FIG. 4B illustrates an isometric view of a hat shaped curved aircraft substructure repair stiffener in accordance with an example of the disclosure. The curved aircraft substructure repair stiffener 410 may be, for example, the curved aircraft substructure repair stiffener 412 bent into the hat shape. Each individual leg flange 422A-O and 430A-O and side flange 424A-O and 428A-O may not be connected to other individual leg flanges and side flanges. However, leg flange 422A may be coupled to corresponding side flange 424A and the side flange 424A may then be coupled to the top portion 414. Other leg flanges and side flanges may also be coupled in that manner.

The top portion 414 may be bent such that the curved aircraft substructure repair stiffener 410 substantially conforms to a curvature of the portion of the aircraft 100 that the curved aircraft substructure repair stiffener 410 is repairing and/or is coupled to.

In certain examples, one or more of web stocks 428A, 428B, 430, and/or 432 may be coupled to portions of the curved substructure repair stiffener 410 to stiffen the curved substructure repair stiffener 410. For example, the web stock 428A may be coupled to at least a portion of the side portion 416A, the web stock 428B may be coupled to at least a portion of the side portion 416B, the web stock 430 may be coupled to the top portion 414, and the web stock 432 may be coupled to the leg portion 418A and/or 418B. While the examples of FIG. 4B show the web stocks 428A, 428B, 430, and/or 432 coupled to one side of the portions of the curved substructure repair stiffener 410, other examples may couple the web stocks 428A, 428B, 430, and/or 432 to another side of the portions of the curved substructure repair stiffener 410.

While FIGS. 3B and 4B may illustrate Z shaped and hat shaped curved substructure repair stiffeners, other examples may include curved substructure repair stiffeners in other shapes (e.g., L shaped, M shaped, or other such shapes). Additionally, various examples of the curved substructure repair stiffener may be made from metals (e.g., aluminum, steel, titanium, copper, and/or other metals), composites (e.g., carbon fiber, fiberglass, and/or other composites), wood, and/or other materials.

Figure 5:
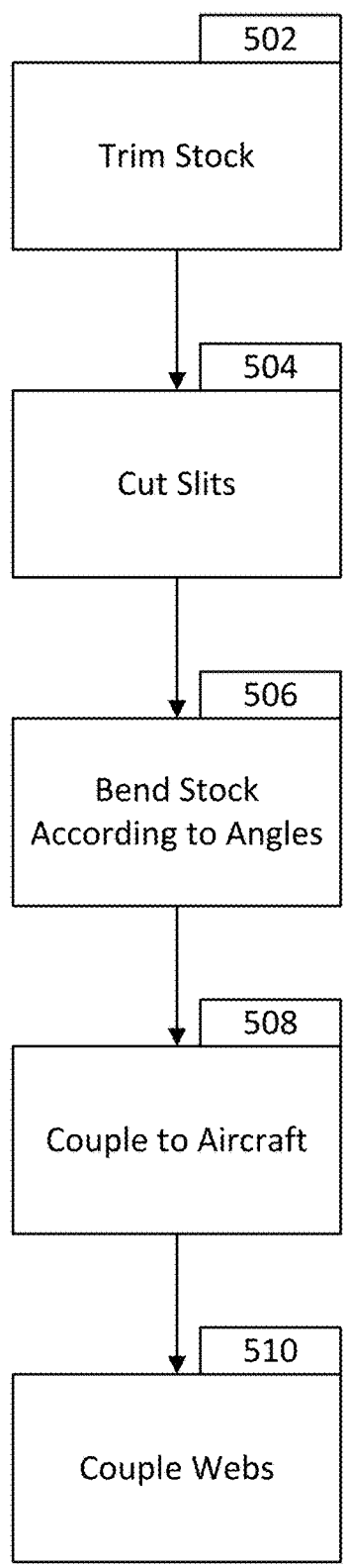
FIG. 5 illustrates a sequence of operation of repairing a curved aircraft structure with a curved aircraft substructure repair stiffener in accordance with an example of the disclosure.

FIG. 5 illustrates a sequence of operation of repairing a curved aircraft structure with a curved aircraft substructure repair stiffener in accordance with an example of the disclosure. The process described in FIG. 5 may be performed as a factory repair, as a field repair, or as another type of repair. In certain examples, a flat pattern may be produced (and provided to a mechanical to be bent by a mechanic repairing the aircraft). In certain other examples, a curved aircraft substructure repair stiffener may be produced and provided as a field repair kit (e.g., may be produced with bent portions such as side portions and leg portions, but not curved, that may then be curved when coupled to the aircraft or may be produced as a complete curved aircraft substructure repair stiffener matching a curvature of the aircraft before being provided to the mechanic). In other examples, the curved aircraft substructure repair stiffener may be produced as a field repair.

In block 502, stock may be trimmed into a flat pattern. For example, a piece of sheetmetal or sheet aluminum may be trimmed into a flat pattern that may be configured to be bent into a curved aircraft substructure repair stiffener. In certain examples, the flat pattern may be created via a stencil or other tool, but other examples may allow for the flat pattern to be formed freely (e.g., fully or partially formed through free-hand, ruler, or other techniques of cutting by a mechanic).

In block 504, slits and/or other openings (e.g., slots) may be cut in the flat pattern. The flat pattern may then be bent in block 506. Various portions of the flat pattern may be bent according to the shape of the curved aircraft substructure repair stiffener. As such, for example, a Z-shaped stiffener may be bent at least twice, while a hat-shaped stiffener may be bent at least four times. Other stiffeners in other shapes may be bent a number of different times. Certain examples of stiffeners may bend the stock in 90 degree angles or substantially 90 degree angles (e.g., within +/−5 degrees of 90 degree), but other examples may bend the stock in other angles as needed (e.g., substantially 45 degree angles, substantially 30 degree angles, substantially 60 degree angles, or other angles).

In block 508, the curved aircraft substructure repair stiffener may be coupled to the aircraft. The curved aircraft substructure repair stiffener may, for example, be coupled to a section of the aircraft to strengthen that section. The curved aircraft substructure repair stiffener may be coupled to the aircraft through mechanical fastening, bonding, or another coupling technique.

In block 510, web stock may be coupled to the side portion, top portion, leg portion, and/or other portions of the curved aircraft substructure repair stiffener. In the embodiment shown in FIG. 5, the web stock may be coupled to the curved aircraft substructure repair stiffener after the curved aircraft substructure repair stiffener is coupled to the aircraft, but in certain other examples, the web stock may be coupled to the curved aircraft substructure repair stiffener before the curved aircraft substructure repair stiffener is coupled to the aircraft, during when the curved aircraft substructure repair stiffener is coupled to the aircraft, or after the curved aircraft substructure repair stiffener is coupled to the aircraft. The web stock may be coupled via the same fasteners, processes, and/or techniques that couple the curved aircraft substructure repair stiffener to the aircraft and/or different fasteners, processes, and/or techniques.

Examples described above illustrate but do not limit the invention. It should also be understood that numerous modifications and variations are possible in accordance with the principles of the present invention. Accordingly, the scope of the invention is defined only by the following claims.

What is claimed is:
1. A method comprising:
trimming a first stock into a blank shape; and cutting a plurality of slits into the first stock, wherein the first stock is configured to be bent at least a plurality of times to form:
   a leg portion configured to be coupled to an aircraft;
   a side portion connected to the leg portion; and
   a top portion connected to the side portion, wherein the leg portion and the side portion include the plurality of slits, wherein the plurality of slits divides the leg portion into a plurality of leg flanges and the side portion into a plurality of side flanges, wherein each slit comprises a substantially straight first edge defined by the leg flange and the connected side flange, a substantially straight second edge defined by the adjacent leg flange and side flange, and a point of intersection of the first edge and the second edge, wherein the bent first stock is configured to be coupled to the aircraft to reinforce at least a curved portion of the aircraft, and wherein at least a portion of the top portion is curved, at least partly due to the slits, when the bent first stock is coupled to the aircraft.

2. The method of claim 1, further comprising:
bending the first stock at least the plurality of times to form the leg portion, the side portion, and the top portion.

3. The method of claim 2, wherein bending the first stock comprises:
bending a first segment of the first stock to form the leg portion;
bending a second segment of the first stock to form the top portion, wherein the bent first segment and the bent second segment define edges of the side portion; and
bending at least a portion of the top portion along a curve such that the leg portion substantially conforms to a curvature of a curved portion.

4. The method of claim 2, wherein the side portion comprises at least three side flanges, and wherein the method further comprises:
trimming a second stock into a substantially planar web shape; and
coupling the second stock to at least three of the side flanges by spanning at least a plurality of the slits.

5. The method of claim 2, wherein the side portion is a first side portion comprising a plurality of first side flanges, wherein the plurality of slits is a first plurality of slits, and the method further comprises:
bending the first stock to form a second side portion, wherein the second side portion is bent relative to the top portion at a third angle, and wherein the second side portion comprises a second plurality of slits that divides the second side portion into a plurality of second side flanges, and wherein the second stock is coupled to the first side flanges;
trimming a third stock into a second web shape; and
coupling the third stock to at least a plurality of the second side flanges.

6. The method of claim 2, further comprising:
coupling the leg portion to a curved portion of the aircraft, wherein the leg portion substantially conforms to a curvature of the curved portion and the coupling comprises fastening the leg portion to the aircraft.

7. The method of claim 6,
wherein the top portion is bent at the point of intersection of each slit and substantially flat elsewhere.

8. The method of claim 6, further comprising:
coupling a leg web to at least three of leg flanges after the leg portion is coupled to the curved portion of the aircraft; and
coupling a top web to the top portion.

9. The method of claim 2, wherein the first stock is bent into a Z shape, wherein in the Z shape the leg portion and the top portion are substantially parallel and the side portion is substantially perpendicular to the leg portion and the top portion.

10. The method of claim 9, wherein the side portion comprises at least three side flanges, and wherein the method further comprising:
trimming a second stock into a substantially planar first web shape;
coupling the second stock to a first side of the side portion, wherein coupling the second stock comprises coupling the second stock to at least three of the side flanges by spanning at least a first plurality of the slits;
trimming a third stock into a substantially planar second web shape; and
coupling the third stock to a second side of the side portion, wherein coupling the third stock comprises coupling the third stock to at least three of the side flanges by spanning at least a second plurality of the slits.

11. An apparatus comprising:
a first stock body configured to be bent and coupled to an aircraft to reinforce at leas a curved portion of the aircraft, the first stock body comprising:
   a leg portion comprising a plurality of leg flanges and configured to couple t and substantially conform to a curvature of the curved portion of the aircraft;
   a side portion connected to the leg portion at a first angle and comprising a plurality of side flanges connected to the plurality of leg flanges, wherein each leg flange and connected side flange are separated from an adjacent leg flange and side flange by a slit; and
   a top portion connected to the side portion at a second angle, wherein at least a portion of the top portion is configured to be curved, at least partly due to the slits, when the leg portion substantially conforms to the curvature of the curved portion of the aircraft, wherein each slit comprises a substantially straight first edge defined by the leg flange and the connected side flange, a substantially straight second edge defined by the adjacent leg flange and side flange, and a point of intersection of the first edge and the second edge.

12. The apparatus of claim 11, wherein the leg portion comprises at least three leg flanges, wherein the side portion comprises at least three side flanges, and the apparatus further comprises:
a substantially planar side web coupled to at least three of the side flanges by spanning at least a first plurality of the slits;
a leg web coupled to at least three of the leg flanges and substantially conforming to the curvature of the curved portion of the aircraft by spanning at least a second plurality of the slits; and
a top web coupled to the top portion.

13. The apparatus of claim 11, wherein the first stock body is bent into a Z shape and the Z shape comprises at least the leg portion, the side portion, and the top portion, wherein the first angle defines a first bend of the Z shape, and wherein the second angle defines a second bend of the Z shape, and wherein the leg portion and the top portion are substantially parallel and the side portion is substantially perpendicular to the leg portion and the top portion.

14. The apparatus of claim 11, wherein the first angle and the second angle are the same angle and/or are angles between 85-95 degrees.

15. The apparatus of claim 11, wherein the first stock body is bent into a hat shape, the side portion is a first side portion comprising a plurality of first side flanges and the leg portion is a first leg portion, and the apparatus further comprises:
  a second side portion comprising a plurality of second side flanges connected to the top portion; and
  a second leg portion connected to the second side portion and configured to couple to and substantially conform to a curvature of the curved portion of the aircraft, wherein the ha shape comprises at least the first leg portion connected to the first side portion at the first angle, the first side portion connected to the top portion at the second angle, the top portion connected to the second side portion at a third angle, and the second side portion connected to the second leg portion at a fourth angle, wherein the first leg portion and the second leg portion are substantially parallel with the top portion, wherein the first side portion is coupled to a first side of the top portion, wherein the second side portion is coupled to a second side of the top portion, wherein the first side portion is disposed between the first leg portion and the top portion, and wherein the second side portion is disposed between the second leg portion and the top portion.

16. The apparatus of claim 11, wherein the top portion is bent at the point of intersection of each slit and substantially flat elsewhere.

17. A method of aircraft fuselage repair using the apparatus of claim 11, wherein the leg portion is connected to the side portion at a first angle, wherein the side portion is connected to the top portion at a second angle, and the method comprises:
  coupling the leg portion to the curved portion of the aircraft, wherein the leg portion substantially conforms to a curvature of the curved portion.

18. An aircraft comprising the apparatus of claim 11, the aircraft comprising:
  a fuselage;
  a wing coupled to the fuselage; and
  a propulsor coupled to the fuselage and/or the wing, wherein the apparatus is couple to at least one of the fuselage and/or the wing.

* * * * *

UNITED STATES PATENT AND TRADEMARK OFFICE
CERTIFICATE OF CORRECTION

PATENT NO. : 10,392,132 B2
APPLICATION NO. : 15/224349
DATED : August 27, 2019
INVENTOR(S) : Nicholas Batzakis and Steve Georgiadis It is certified that error appears in the above-identified patent and that said Letters Patent is hereby corrected as shown below:

In the Claims

In Column 8, Line 28, change "at leas" to --at least--.
In Column 8, Line 31, change "couple t" to --couple to--.
In Column 9, Line 15, change "the ha shape" to --the hat shape--.
In Column 10, Line 22, change "couple to" to --coupled to--.

Signed and Sealed this
Fourteenth Day of April, 2020

Andrei Iancu
*Director of the United States Patent and Trademark Office*